Figures 1, 2:
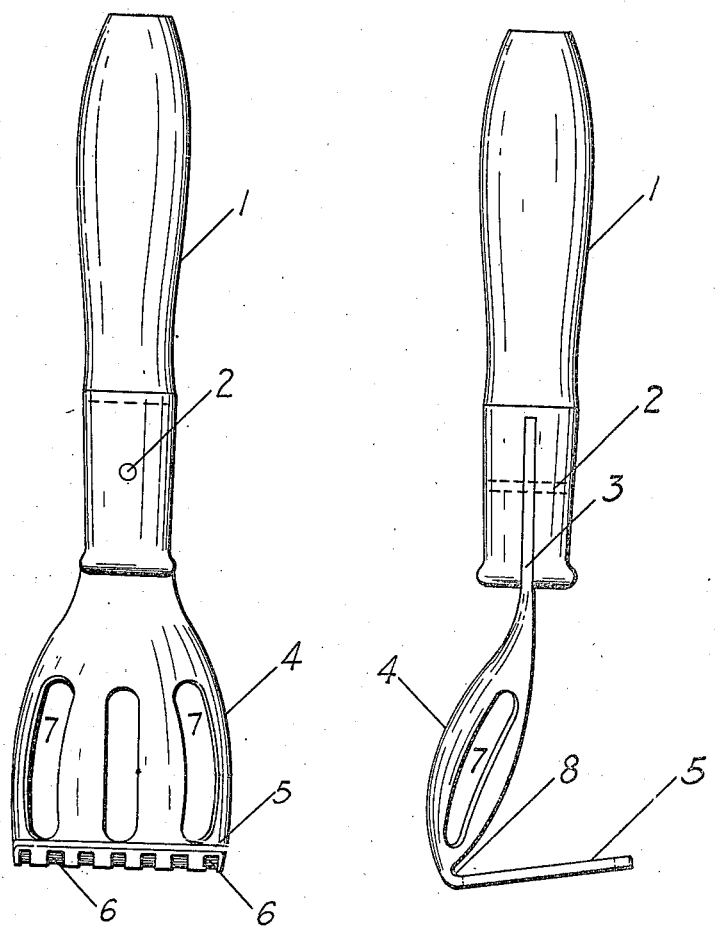

Mar. 6, 1923.

R. W. ROBERTS

COMBINED POTATO MASHER AND BEATER

Filed May 9, 1922

1,447,432

INVENTOR,
Ralph W. Roberts,
By Howard S. Smith,
His ATTORNEY

Patented Mar. 6, 1923.

1,447,432

UNITED STATES PATENT OFFICE.

RALPH W. ROBERTS, OF DAYTON, OHIO.

COMBINED POTATO MASHER AND BEATER.

Application filed May 9, 1922. Serial No. 559,579.

*To all whom it may concern:*

Be it known that I, RALPH W. ROBERTS, a citizen of the United States, residing in the city of Dayton, in the county of Montgomery and State of Ohio, have invented certain new and useful Improvements in Combined Potato Mashers and Beaters, of which the following is a specification.

The principal object of my invention is to provide a combined potato masher and beater which is simple in construction and efficient in use. It not only provides a device in the form of a slotted head for mashing the potatoes and cutting the lumps, but an attached slotted spoon portion by means of which the mashed potatoes may be thoroughly beaten.

In the accompanying drawings, Figure 1 is a bottom plan view of my combined potato masher and beater. Figure 2 is a side elevational view thereof.

Throughout the specification and drawings, similar reference characters denote corresponding parts.

In a detailed description of one form of embodiment of my invention, the numeral 1 designates a handle in a deep recessed portion of the front end of which there is secured, by means of a pin 2, the handle portion 3 of a spoon head 4. The latter is preferably constructed of metal, while the handle 1 is preferably constructed of wood.

The spoon head 4 is dished as shown in the drawings, and inclines slightly upwardly from its rear to its front portion, terminating in a downwardly and rearwardly inclined flat masher head 5. The latter contains a series of narrow upright slots 6 that are preferably of uniform length and width and disposed an equal distance apart. In the spoon head 4 there are provided three relatively wide slots 7, the middle one of which is straight while the two outer ones conform in curvature to the curved side edges of the spoon head. (See Figures 1 and 2.)

At the point 8 where the spoon and masher portions of the device are joined, the metal is rolled as shown in Figure 2 to give the masher head 5 the necessary resiliency when it is forced down upon the potatoes. Being slightly inclined to the rear, this masher head 5 will spring back to its normal position after each mashing operation.

In use, the device is firmly grasped by the hand and brought to an upright position, with the masher head 5 above the potatoes. This slotted head 5 is then forced down upon the potatoes a sufficient number of times to thoroughly mash them. As the head 5 descends upon a potato, it will not only mash the latter but will cut out its lumps. This is due to the fact that the lumps or hard massed portions of the potato will be cut by the sharp edges of the material around the slots 6 when the pulp of the potato is forced through them by the pressure of the downwardly descending masher head.

After the potatoes have been thoroughly mashed, and milk added, they are beaten into a creamy mass by whipping the spoon head 4 through them. During this whipping operation, the mass will pass continuously through the slots 7 in the spoon head 4 for thorough disintegration thereby. By thus beating the mashed pulp, it will be expanded into a creamy mass free from gritty or lumpy particles.

It is thus seen that my combined potato masher and beater will accomplish what the ordinary potato masher will rarely do—cut out the lumps during the mashing operation and beat the pulp into a creamy mass free from gritty and lump particles.

Having described my invention, I claim:

1. In a device of the type described, the combination with a spoon, of a flat slotted masher head on the front end of said spoon, turned at an angle thereto.

2. In a device of the type described, the combination with a slotted beater spoon, of a flat slotted masher head on the front end of said spoon, turned at an angle thereto.

3. In a device of the type described, the combination with a beater spoon provided with longitudinal slots in its dished portion, of a handle for said spoon, and a flat piece containing a series of upright slots, integral with the front end of said spoon, and projecting from the latter at an approximate right angle thereto.

In testimony whereof I have hereunto set my hand this 21st day of April, 1922.

RALPH W. ROBERTS.

Witness:
HOWARD S. SMITH.